United States Patent
Denman et al.

(10) Patent No.: US 9,996,490 B2
(45) Date of Patent: Jun. 12, 2018

(54) TECHNIQUE FOR SCALING THE BANDWIDTH OF A PROCESSING ELEMENT TO MATCH THE BANDWIDTH OF AN INTERCONNECT

(71) Applicant: NVIDIA CORPORATION, Santa Clara, CA (US)

(72) Inventors: Marvin A. Denman, Round Rock, TX (US); Dennis K. Ma, Austin, TX (US); Stephen David Glaser, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 624 days.

(21) Appl. No.: 14/031,803

(22) Filed: Sep. 19, 2013

(65) Prior Publication Data

US 2015/0082075 A1    Mar. 19, 2015

(51) Int. Cl.
| | |
|---|---|
| *G06F 13/40* | (2006.01) |
| *G06F 13/42* | (2006.01) |
| *G06F 5/06* | (2006.01) |
| *G06F 1/32* | (2006.01) |

(52) U.S. Cl.
CPC ............ *G06F 13/4009* (2013.01); *G06F 5/06* (2013.01); *G06F 13/42* (2013.01); *G06F 1/324* (2013.01); *G06F 1/3296* (2013.01); *Y02B 60/1217* (2013.01)

(58) Field of Classification Search
CPC ..... G06F 5/00; G06F 5/01; G06F 5/06; G06F 13/40; G06F 13/4004; G06F 13/4009; G06F 13/4027; G06F 13/4063; G06F 13/42; G06F 1/324; G06F 1/3296
See application file for complete search history.

(56) References Cited

U.S. PATENT DOCUMENTS

| | | | | |
|---|---|---|---|---|
| 4,025,720 | A | * | 5/1977 | Pachynski, Jr. ........... H04J 3/07 370/506 |
| 4,215,245 | A | * | 7/1980 | Bellisio ............... H04L 25/4906 370/545 |
| 4,661,966 | A | * | 4/1987 | Schreiner ................. H04J 3/07 370/477 |
| 4,709,227 | A | * | 11/1987 | Guerillot ............ H04L 25/4908 341/61 |

(Continued)

OTHER PUBLICATIONS

Stewart, Donn. "Flip-Flops and Registers". Online 2004. Retrieved from Internet Aug. 23, 2017. <http://cpuville.com/register.htm>.*

(Continued)

*Primary Examiner* — Thomas J Cleary
(74) *Attorney, Agent, or Firm* — Artegis Law Group, LLP

(57) ABSTRACT

A transmitter is configured to scale up a low bandwidth delivered by a first processing element to match a higher bandwidth associated with an interconnect. A receiver is configured to scale down the high bandwidth delivered by the interconnect to match the lower bandwidth associated with a second processing element. The first processing element and the second processing element may thus communicate with one another across the interconnect via the transmitter and the receiver, respectively, despite the bandwidth mismatch between those processing elements and the interconnect.

22 Claims, 9 Drawing Sheets

(56) References Cited

U.S. PATENT DOCUMENTS

| | | | | |
|---|---|---|---|---|
| 4,764,941 | A * | 8/1988 | Choi | H04J 3/076 370/506 |
| 4,796,281 | A * | 1/1989 | Takasaki | H04J 3/073 375/363 |
| 6,097,739 | A * | 8/2000 | Yamashita | H04N 21/23611 370/395.51 |
| 7,787,502 | B1 | 8/2010 | Olsson et al. | |
| 9,626,320 | B2 * | 4/2017 | Denman | G06F 13/4009 |
| 2003/0063018 | A1 * | 4/2003 | Warren | G06F 13/1678 341/68 |
| 2009/0046808 | A1 * | 2/2009 | Varadarajan | H04L 1/0067 375/302 |
| 2011/0134982 | A1 * | 6/2011 | Reinhardt | H04L 1/0043 375/224 |
| 2015/0082075 | A1 * | 3/2015 | Denman | G06F 1/324 713/501 |

OTHER PUBLICATIONS

Lin, Charles. "What's a Register?". Department of Computer Science, University of Maryland. CMSC 311. Spring 2003. Online Apr. 12, 2003. Retrieved from Internet Aug. 23, 2017. <https://www.cs.umd.edu/class/sum2003/cmsc311/Notes/CompOrg/register.html>.*

Ebling, Carl. "Registers". Department of Computer Science and Engineering, University of Washington. CSE 567. Fall 1998. Online 1998. Retrieved from Internet Aug. 23, 2017. <https://courses.cs.washington.edu/courses/cse567/98au/ppt/05a-sequential/sId004.htm>.*

Non-Final Office Action for U.S. Appl. No. 14/031,776, dated Mar. 10, 2016.

* cited by examiner

TECHNIQUE FOR SCALING THE BANDWIDTH OF A PROCESSING ELEMENT TO MATCH THE BANDWIDTH OF AN INTERCONNECT

BACKGROUND OF THE INVENTION

Field of the Invention

Embodiments of the present invention relate generally to data interconnects and, more specifically, to a technique for scaling the bandwidth of a processing element to match the bandwidth of an interconnect.

Description of the Related Art

A conventional computing device typically includes various processing units coupled together via a high-speed interconnect. The processing units are configured to exchange data with one another across the high-speed interconnect according to different clock signals that drive the high-speed interconnect and the processing units. Conventional high-speed interconnects typically operate at a specific clock rate that may not be easily scaled down. Older processing units typically operate at a clock rate that can be matched to the clock rate associated with the high-speed interconnect.

However, modern processing units may operate with variable clock rates under different operating conditions. For example, a central processing unit (CPU) within a mobile device may operate with a lower clock rate when processing demands are relatively low in order to conserve power. Such functionality may present a mismatch between the specific clock rate of the high-speed interconnect, and the variable clock rate of the processing units to which that interconnect is coupled. Consequently, the high-speed interconnect may, at times, deliver more bandwidth to a given processing element than the processing element can receive.

One solution to the problem described above is to configure the processing unit to buffer all incoming data, and to then read that data with the clock rate of the processing unit. However, this solution may require large buffers, and even so, those buffers may overrun. To prevent buffer overrun, the processing unit may track buffer consumption, and then communicate with an upstream transmitter an amount of data to send that will fit into the buffer. However, this solution can be complex and unwieldy.

Accordingly, what is needed in the art is a technique for mitigating a bandwidth mismatch between a processing element and an interconnect.

SUMMARY OF THE INVENTION

One embodiment of the present invention sets forth a computer-implemented method for scaling the bandwidth of a processing element to match the bandwidth of an interconnect, including receiving, at a first bandwidth, a first data block from a first processing element, where the first processing unit operates at the first bandwidth, positioning the first data block to present a first non-discardable value included in the first data block to the interconnect, transmitting, at a second bandwidth, the first non-discardable value to a second processing element, where the interconnect operates at the second bandwidth, determining that a first discardable value should be transmitted to the second processing element based on a mask bit included in a first serial mask, and transmitting, at the second bandwidth, the first discardable value to the second processing element.

One advantage of the disclosed technique is that processing elements with variable clock rates may retain the ability to communicate with one another across an interconnect in computer systems where the clock rate of the interconnect cannot be easily changed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
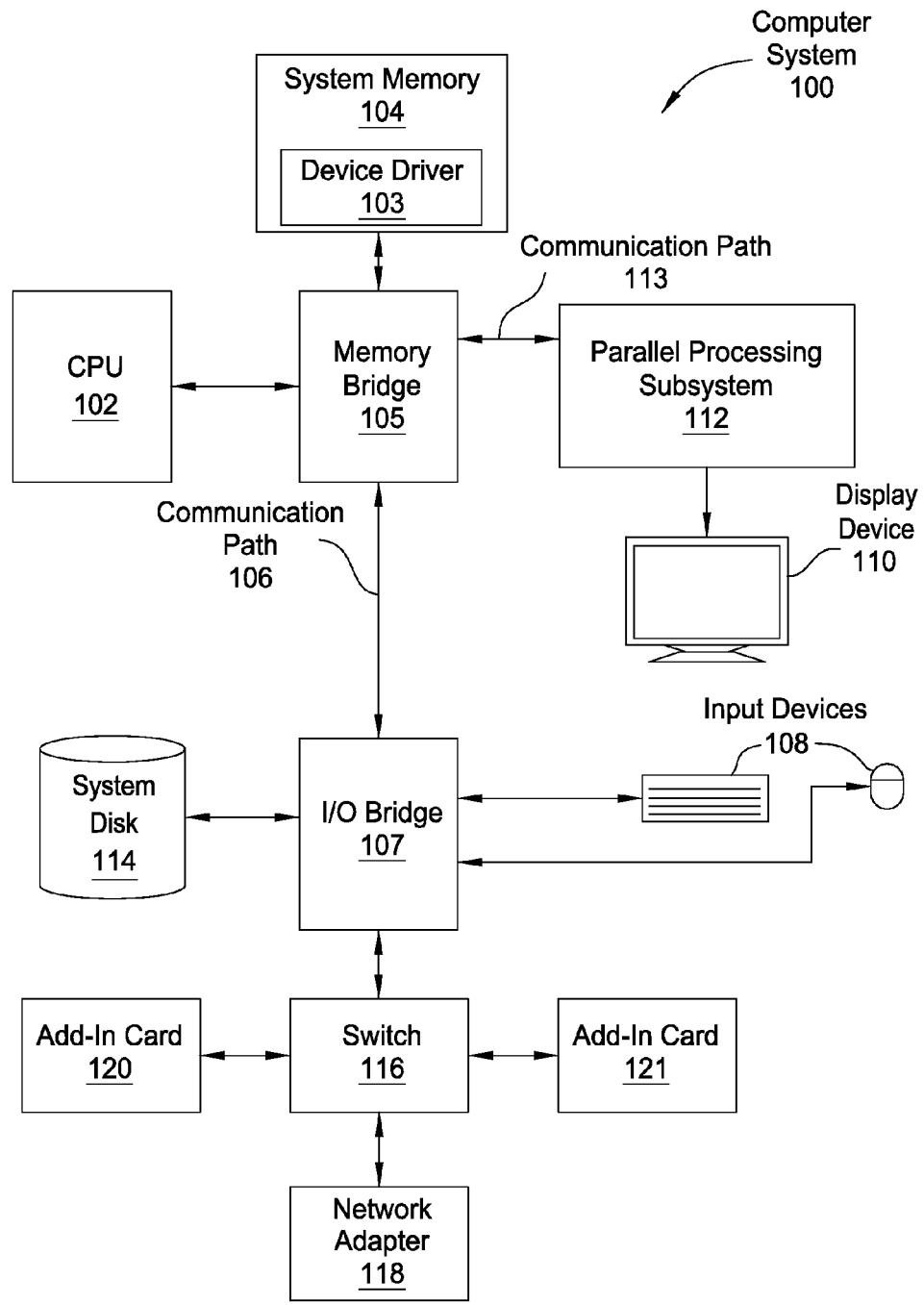
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
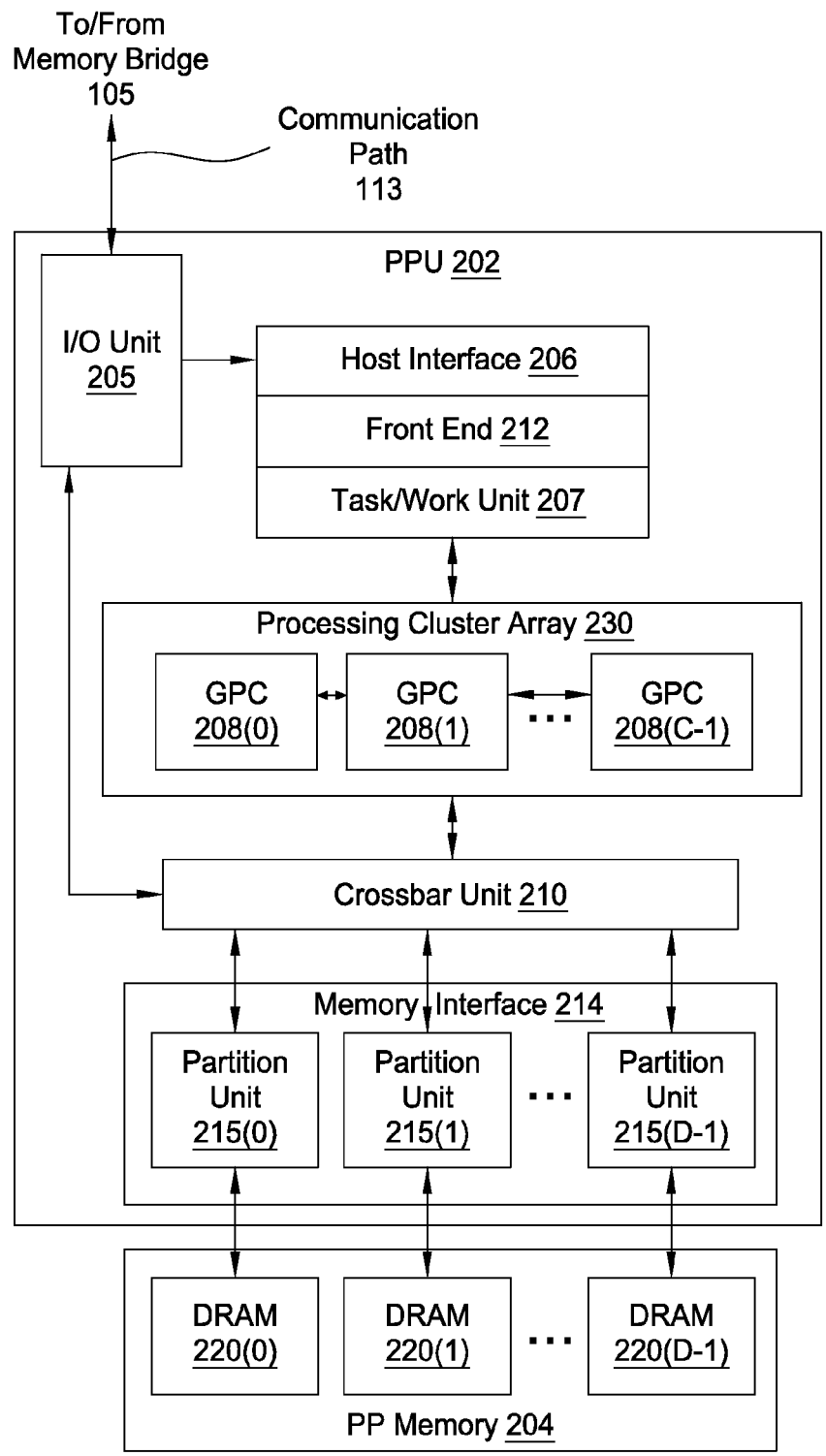
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
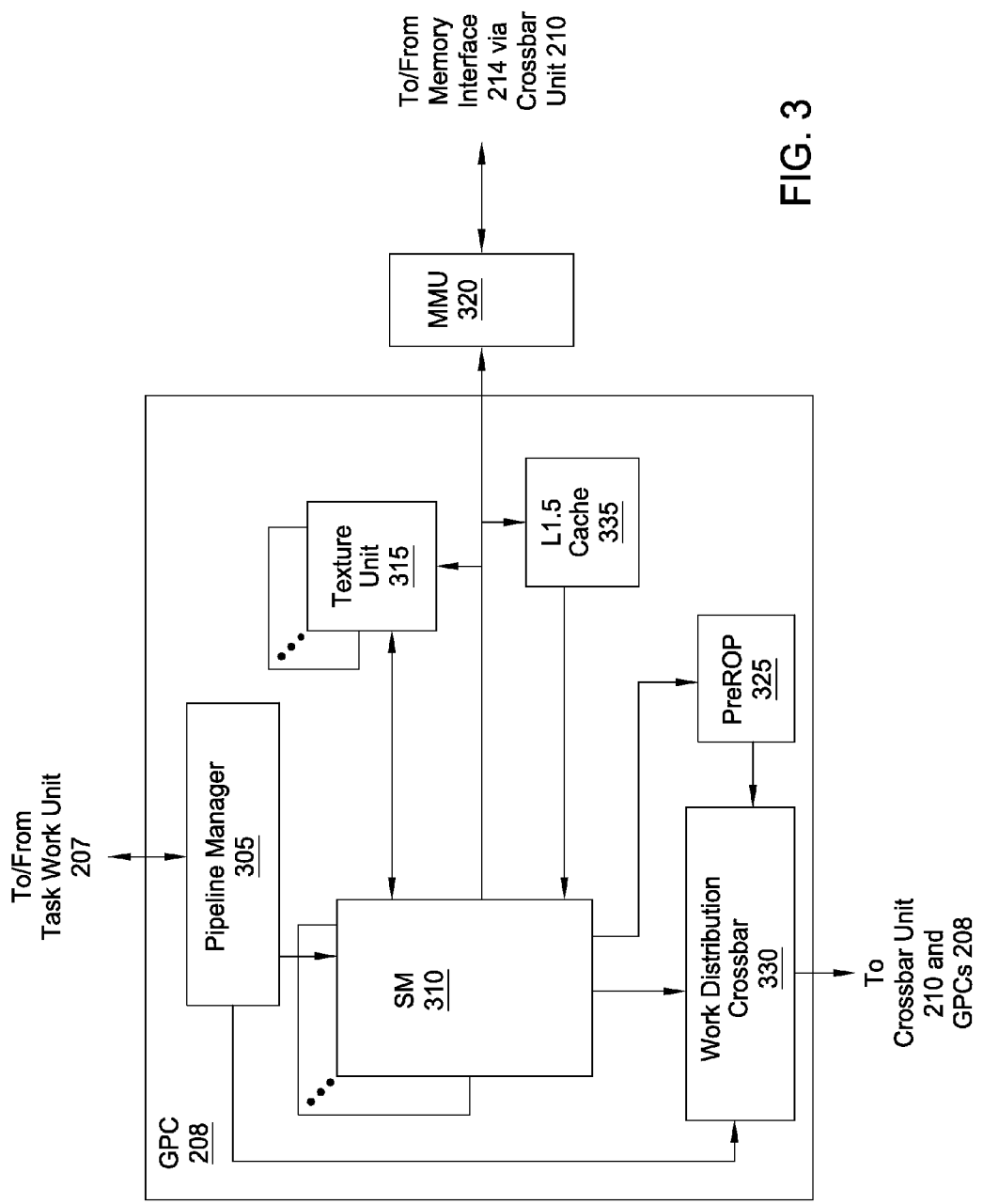
FIG. 3 is a block diagram of a general processing cluster included in the parallel processing unit of FIG. 2, according to one embodiment of the present invention.

FIG. 3 is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the present invention.

Transmitting Data Across an Interconnect Having a Specific Bandwidth

Referring generally to FIGS. 1-3, many of the elements discussed above may operate according to a variable clock rate. For example, PPU 202 shown in FIG. 2 may dynamically scale voltage and/or frequency in order to conserve power, thereby reducing a clock rate at which PPU 202 operates. When a given element scales voltage and/or frequency in this fashion, different types of bandwidth associated with the element may change proportionally, including the bandwidth at which the element can transmit data and the bandwidth at which the element can receive data.

However, the elements discussed above may be coupled together by a wide variety of different interconnects, including those which operate at a specific clock rate, and, thus, specific bandwidth. The clock rate of such an interconnect may not be changeable or, alternatively, changing that clock rate may not be desirable. When a given element scales voltage and/or frequency in the fashion discussed above, the bandwidth of the element, in some cases, may not match the bandwidth of the interconnect. In order to mitigate this mismatch, such an element may adjust the bandwidth according to which data is transmitted and/or received by implementing the inventive techniques described below in conjunction with FIGS. 4-9. A first embodiment of the present invention is described below in conjunction with FIGS. 4-6. A second embodiment of the present invention is described below in conjunction with FIGS. 7-9.

Scaling Bandwidth by Adding and Removing Repeated Data

Figure 4:
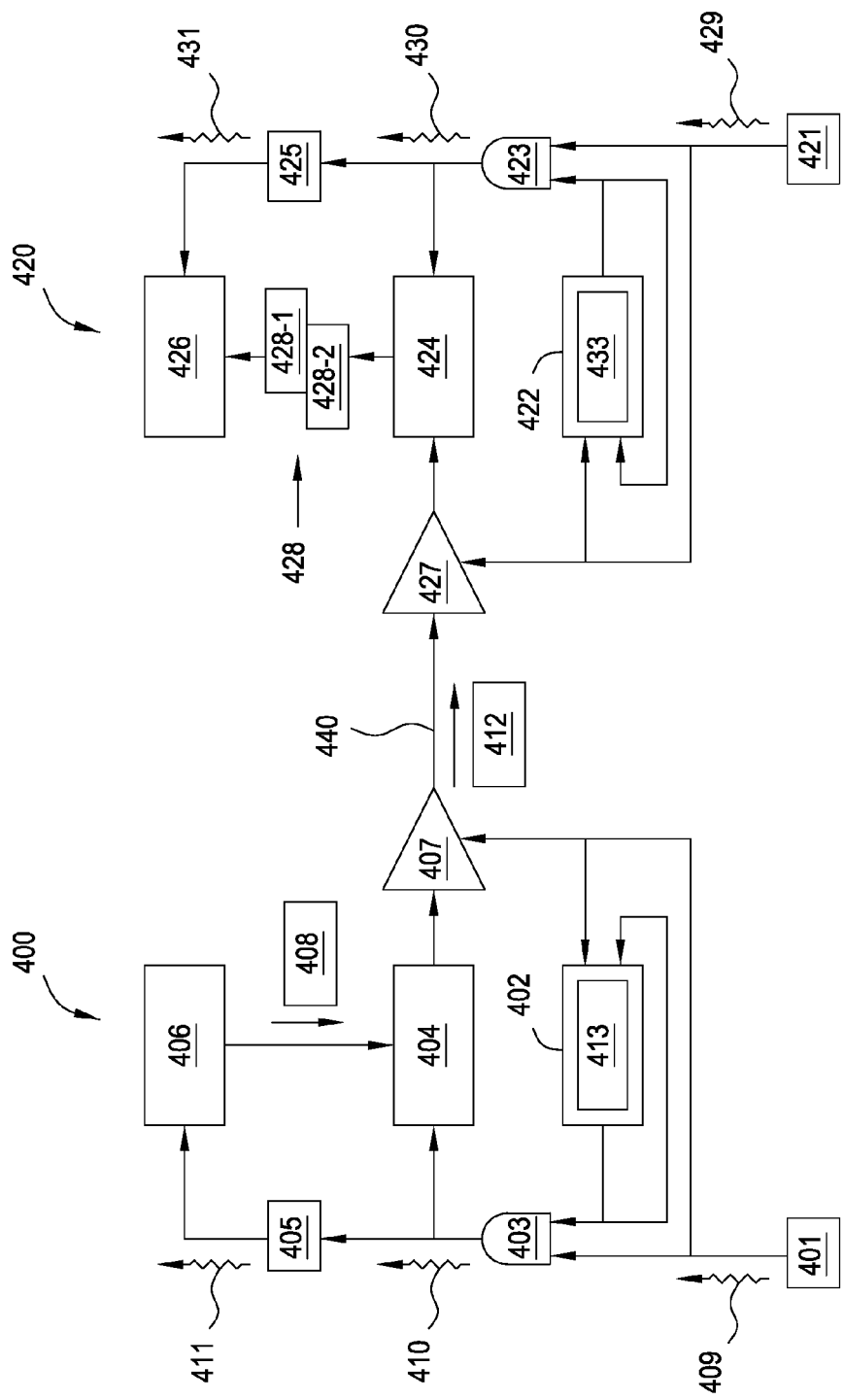
FIG. 4 is a block diagram of a transmitter and a receiver that operate at a low bandwidth coupled together by an interconnect that operates at a high bandwidth, according to one embodiment of the present invention.

FIG. 4 is a block diagram of a transmitter 400 and a receiver 420 that operate at a low bandwidth coupled together by an interconnect 440 that operates at a high bandwidth, according to one embodiment of the present invention. Transmitter 400, receiver 410, and interconnect 420 may be integrated into a wide variety of different computing devices, including desktop computers and laptop computers, as well as mobile devices, such as cell phones and tablet computers. Transmitter 400 and/or receiver 420 may be included with any of the elements described above in conjunction with FIGS. 1-3, including CPU 102, PPU 202, GPC 208, SM 310, etc. Either of transmitter 400 and receiver 420 may also reside within a combination of processing units, including, for example, a system-on-a-chip (SoC). Interconnect 420 may be any type of interconnect, such as, e.g., a serial data bus, among others.

As a general matter, transmitter 400 and receiver 420 reside within elements that are configured to scale operating frequency and/or voltage under various circumstances. Additionally, those elements may scale the bandwidth with which data can be produced or consumed in proportion to that operating frequency. However, interconnect 420 may operate with a specific frequency and a specific bandwidth. Accordingly, a bandwidth mismatch may exist between transmitter 400 and interconnect 440 and between receiver 420 and interconnect 440. To mitigate this bandwidth mismatch, transmitter 400 includes specialized hardware that allows transmitter 400 to scale the bandwidth with which data is transmitted up to match that of interconnect 440. Similarly, receiver 420 includes specialized hardware that allows receiver 440 to scale back down the bandwidth with which data is received.

As shown, transmitter 400 includes a serial clock 401, a shift mask register 402 that includes a serial mask 413, an AND gate 403, a serializer 404, a clock divider 405, a data source 406, and a serial interface 407. Serial clock 401 is coupled to serial mask register 402, AND gate 403, and serial interface 407. Serial mask register 402 is coupled to AND gate 403, which, in turn, is coupled to serializer 404 and clock divider 405. Clock divider 405 is coupled to data source 406, which, in turn, is coupled to serializer 404. Data source 406 is configured to provide data block 408 to serializer 404 for transmission to receiver 420 via interconnect 440. Serializer 404 is coupled to serial interface 407. In some embodiments, certain portions of transmitter 400 may reside elsewhere within the element that includes transmitter 400, including data source 406 and serial clock 401, among others.

In order to transmit data block 408 to receiver 420, transmitter 400 is configured to scale the size of data block 408 up to match the bandwidth of interconnect 440. In doing so, transmitter 440 interleaves discardable data with portions of data block 408 to generate data 412. Data 412 may then be transmitted across interconnect 440 at the bandwidth of interconnect 440. The bandwidth of interconnect 440 is derived from serial clock 401, which drives serial interface 407. Transmitter 400 interleaves data block 408 with the discardable data to generate data 412 based on serial mask 413 that is stored within serial mask register 402.

Serial mask 413 is a series of binary values. Serial mask register 402 is a circular register that shifts serial mask 413 at each serial clock signal 409 received from serial clock 401. A particular bit within serial mask register 402 is designated as the "mask bit" and may correspond to any of the binary values of serial mask 413. Since serial mask register 402 shifts serial mask 413 at every serial clock signal 409, the mask bit will correspond to a different binary value within serial mask 413 at each different serial clock signal. The mask bit indicates whether transmitter 400 should transmit discardable data. In practice, when serial mask 413 indicates that discardable data should be transmitted, transmitter 400 simply transmits a previously transmitted value from within data block 408. However, the discardable data may also be a preset value such as, e.g., zero. In one embodiment, when data 412 includes repeated instances of values from data block 408, the error rate associated with transmitting data 412 may be reduced.

In another embodiment, serial mask 413 is substantially wider than a data path between transmitter 400 and receiver 420, and, thus, different data blocks transmitted during different cycles may be masked according to different portions of serial mask 413. For example, if the serial mask for an 8 bit wide data path was 0xff to enable all bits, then the serial mask for a 16 bit wide data path across two cycles could be 0xff00 or 0x5555.

At each serial clock signal 409, serial shift register 402 shifts serial mask 413 and outputs the value of the current mask bit to AND gate 403. AND gate 403 performs an AND operation with the mask bit and serial clock signal 409 to produce gated clock signal 410. Gated clock signal 410 is slower than serial clock signal 409 and potentially irregular, depending on the pattern of binary values within serial mask 413. Gated clock signal 410 indicates when non-discardable data should be transmitted across interconnect 420. AND gate 403 provides gated clock signal 410 to serializer 404 and clock divider 405.

Serializer 404 is configured to receive data block 408 from data source 406. Data block 408 is a series of binary values. At each gated clock signal 410, serializer 404 shifts data block 408 so that serial interface 407 may transmit a different binary value from data block 408 across interconnect 420. However, as noted above, the gated clock signal is slower than serial clock 401. As such, serial interface 407 may transmit repeated, discardable binary values from within data block 408 while waiting for gated clock signal 410 to cause serializer 404 to shift data block 408. When gated clock signal 410 arrives, indicating that non-discardable data should be transmitted, serializer 404 shifts data block 408, and serial interface 407 then transmits a new, non-discardable binary value across interconnect 420. Then, serial interface 407 repeatedly transmits that same value while waiting for another gated clock signal.

When all of data 408 has been transmitted across interconnect 420 in this fashion (i.e., within data 412), serializer 404 may receive a new data block from data source 406. Data source 406 provides data to serializer 404 according to divided clock signal 411. Clock divider 406 divides gated clock signal 410 from AND gate 403 based on the width of data block 408. For example, if data block 408 is 16 bits wide, then clock divider 406 would divide gated clock signal 410 by 16. Generally, each gated clock signal 410 causes one of the N bits within data block 408 to be transmitted across interconnect 420. After N gated clock signals, all of data block 408 has been transmitted, and at that time, clock divider 405 outputs divided clock signal 411 in order to cause data source 406 to output another data block.

With the approach described thus far, transmitter 400 is capable of scaling the size of data block 408 up to match the bandwidth of interconnect 440, thereby generating data 412. Receiver 420 is configured to receive data 412 at the scaled-up bandwidth. Receiver 410 then scales the size of data 412 back down to match that of the original data (e.g., data 408). Receiver 420 is described in greater detail below.

As shown, receiver 420 includes a serial clock 421, a shift mask register 422 that includes a serial mask 433, an AND gate 423, a deserializer 424, a clock divider 425, a data destination 426, a serial interface 427, and parallel flops 428 that include flops 428-1 and 428-2. Serial clock 421 is coupled to serial mask register 422, AND gate 423, and serial interface 427. Serial mask register 422 is coupled to AND gate 423, and AND gate 423 is coupled to deserializer 424 and clock divider 425. Clock divider 425 is coupled to data destination 426, which, in turn, is coupled to parallel flops 428. Parallel flops 428 are coupled to deserializer 424, which, in turn, is coupled to serial interface 427. In some embodiments, certain elements of receiver 420 may reside elsewhere within the element that includes receiver 420, including data destination 426 and serial clock 421, among others.

Receiver 420 is configured to receive data 412 from transmitter 400 across interconnect 440 with a bandwidth that is derived from the clock rate associated with interconnect 440. Receiver 420 may receive data 412 over many cycles of serial clock 411. Serial clock 421 and serial clock 401 are synchronized with the clock rate of interconnect 420. In one embodiment, a single clock implements both of serial clocks 401 and 421 and drives interconnect 440. Upon receiving data 412 across interconnect 440 at the corresponding bandwidth, receiver 420 may need to store that data (i.e., within data destination 426) at a lower bandwidth that depends on a lower clock rate. An element that includes receiver 420 generally sets that lower clock rate. To mitigate this bandwidth mismatch, receiver 420 scales the size of data 412 down to the original size associated with data block 408 by removing the discardable data included within data 412 by transmitter 400. Receiver 420 removes the discardable data based on serial mask 433 that is stored within serial mask register 422.

Serial mask 433 includes the same pattern of bits as serial mask 413 stored within serial mask register 402. Like serial mask register 402, serial mask register 422 is a circular register that shifts serial mask 433 at each serial clock signal 429 received from serial clock 421. A particular bit within serial mask register 422 is designated as the "mask bit," which may correspond to any of the binary values of serial mask 433. The mask bit indicates whether receiver 420 should discard a certain portion of data 412.

At each serial clock signal 429, serial shift register 422 shifts serial mask 433 and outputs the value of the current mask bit to AND gate 423. AND gate 423 performs an AND operation with the mask bit and serial clock signal 429 to produce gated clock signal 430. Gated clock signal 430 is slower than serial clock signal 429 and potentially irregular, depending on the pattern of binary values within the serial mask. Gated clock signal 430 indicates when non-discardable data are to be received across interconnect 440. AND gate 423 provides gated clock signal 430 to deserializer 424 and clock divider 425.

Deserializer 424 is configured to receive data 412 from serial interface 427 one bit at a time. At any given time, deserializer 424 may store any portion of data 412. At each gated clock signal 430 from AND gate 415, deserializer 424 shifts that portion so that serial interface 427 may write another binary value from data 412 into deserializer 424 at another position. However, as noted above, gated clock signal 430 is slower than serial clock signal 429. As such, serial interface 427 may write certain binary values from within data 412 into deserializer 414 repeatedly at the same position while waiting for gated clock signal 430 to cause serializer 424 to shift. Since gated clock signal 430 from AND gate 423 is synchronized with the gated clock signal 413 from AND gate 403 (i.e., based on the same serial mask), serializer 424 only shifts in order to receive new, non-discardable data. When gated clock signal 430 arrives, indicating that non-discardable data is to be received, deserializer 424 shifts, and serial interface 427 writes a new, non-discardable binary value into deserializer 424.

When all of data 412 has been received into deserializer 424, deserializer 424 may output a data block to data destination 426. In embodiments where the discardable data constitutes zeros or other constant data (i.e., as opposed to repeated values), deserializer 424 may output that data block to parallel flops 428 in order to remove the discardable data. Flops 428 may buffer incoming data blocks and then reconstruct the original data based on serial mask 433.

Data source 426 receives data from deserializer 424 according to a divided clock signal 431 received from clock divider 425. Clock divider 425 is synchronized with clock divider 405 and generally divides gated clock signal 430 from AND gate 423 based on the width of data output by deserializer 424. After N gated clock signals 430 from AND gate 423, all of data 412 has been received, and at that time, clock divider 425 outputs divided clock signal 431 indicating that data 412 has been successfully deserialized and may be output to data destination 426.

When implementing the approach described above, transmitter 400 and receiver 420 may negotiate a common serial mask by communicating with one another across interconnect 440, or may select the same preset serial mask from a collection of possible serial masks. Generally, transmitter 400 and receiver 440 may implement any technically feasible approach in order to negotiate a common serial mask to use when adjusting bandwidth in the fashion described above.

An advantage of the techniques described herein is that elements that include transmitter 400 and receiver 420 may scale voltage and/or frequency, thereby reducing their respective clock rates, yet retain the ability to communicate with one another over interconnect 440 at higher bandwidth. Persons skilled in the art will recognize that a given element within computer system 100 may include instances of both transmitter 400 and receiver 420, thereby allowing that element to scale bandwidth up for transmission purposes and scale bandwidth down for reception purposes. The functionality of transmitter 400 is described, in stepwise fashion, below in conjunction with FIG. 5.

Figure 5:
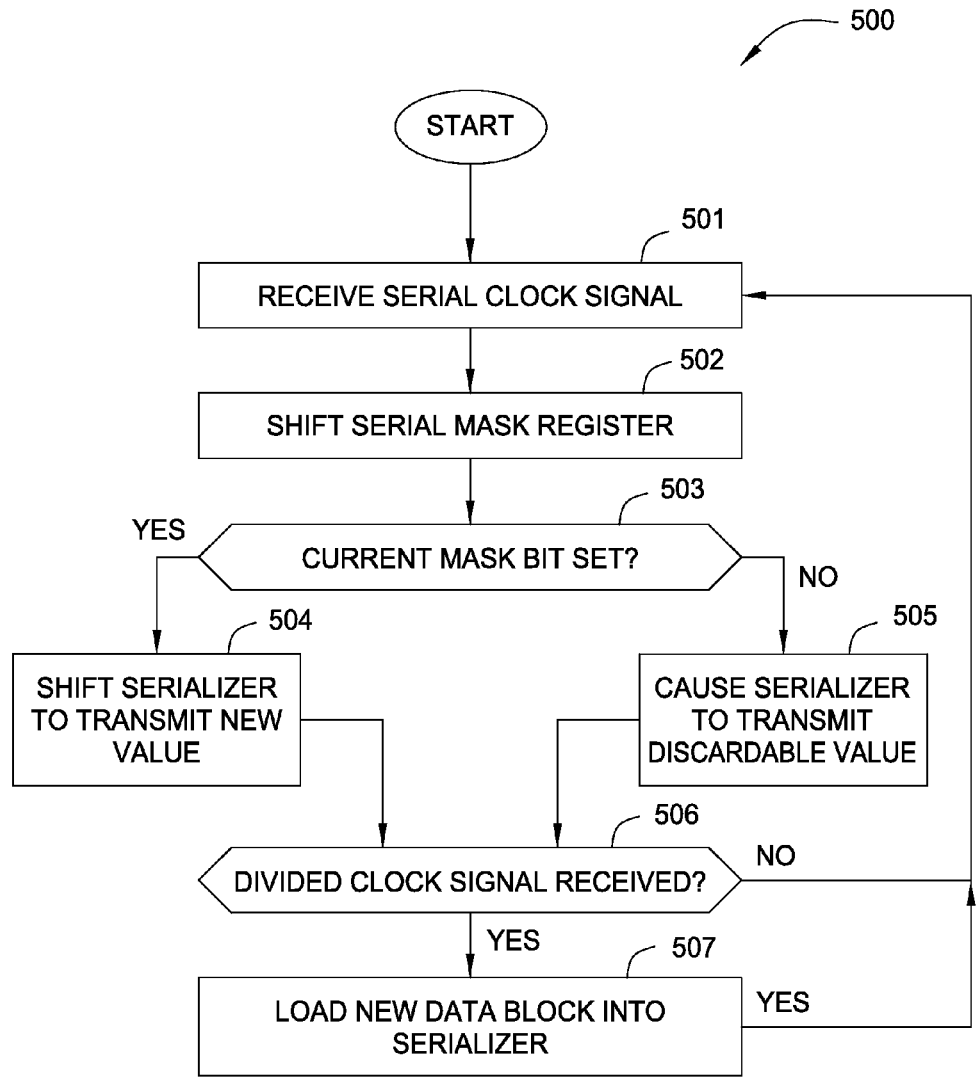
FIG. 5 is a flow diagram of method steps for scaling the bandwidth associated with a transmitter to match the bandwidth associated with an interconnect, according to one embodiment of the present invention.

FIG. 5 is a flow diagram of method steps for scaling the bandwidth of a transmitter to match a higher bandwidth associated with an interconnect, according to one embodiment of the present invention. Although the method steps are described in conjunction with the systems of FIGS. 1-4, persons skilled in the art will understand that any system configured to perform the method steps, in any order, is within the scope of the present invention.

As shown, a method 500 begins at step 501, where serial mask register 402 within transmitter 400 receives serial clock signal 409. Serial mask register 402 includes serial mask 413 that represents a pattern for incorporating discardable data into data block 408. At step 502, serial shift register 402 shifts serial mask 413. At each shift of serial mask 413, a new binary value of that mask becomes the "mask bit" which indicates whether a discardable value should be transmitted across interconnect 420 at the current serial clock cycle. At step 503, AND gate 403 determines whether the mask bit is currently set. If the mask bit is set, indicating that discardable data should not be transmitted, then the method 500 proceeds to step 504. At step 504, serializer 404 shifts data block 408 and transmits a new value from within that data block.

At step 503, if the mask bit is not set, then the method 500 proceeds to step 505, where serializer 404 transmits a discardable value. In practice, the discardable value is a repeated value from data block 408. However, the discardable value could be any type of value. At step 506, data source 406 determines whether divided clock signal 411 was received from clock divider 405. Divided clock signal 411 indicates that data block 408 has been entirely transmitted across interconnect 408. If divided clock signal 411 was not received, then the method 500 returns to step 501. Otherwise, the method 500 proceeds to step 507, where data source 406 loads a new data block into serializer 404. The method 500 then repeats.

Transmitter 400 is configured to implement the method 500 in order to scale the size of data block 408 up to match the bandwidth associated with interconnect 440. With this approach, a processing element that includes transmitter 400 may operate with a low bandwidth, yet still retain the ability to transmit data at a much higher bandwidth across interconnect 420. Receiver 420 may then receive that data at the high bandwidth, and scale that bandwidth back down by implementing a technique that is described in stepwise fashion below in conjunction with FIG. 6.

Figure 6:
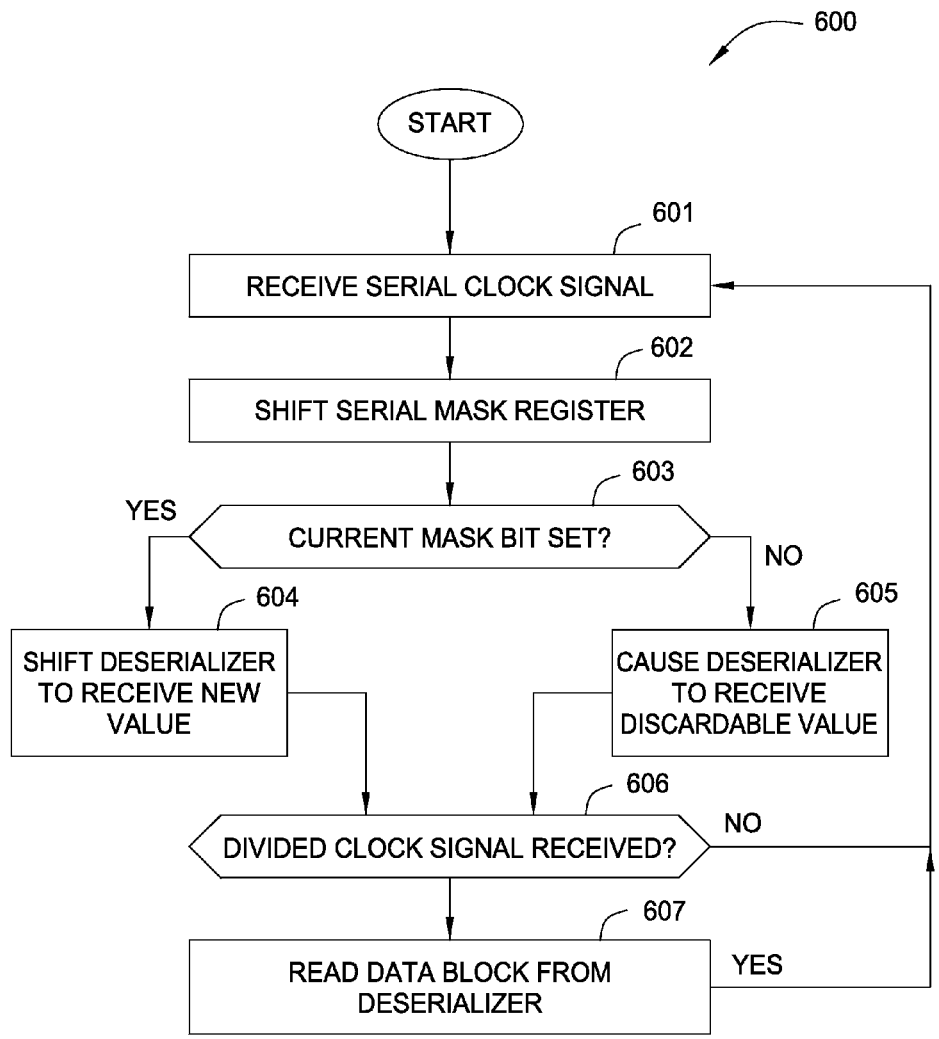
FIG. 6 is a flow diagram of method steps for scaling the bandwidth associated with an interconnect to match the bandwidth of a receiver, according to one embodiment of the present invention.

FIG. 6 is a flow diagram of method steps for scaling the bandwidth associated with an interconnect to match the bandwidth of a receiver, according to one embodiment of the present invention. Although the method steps are described in conjunction with the systems of FIGS. 1-4, persons skilled in the art will understand that any system configured to perform the method steps, in any order, is within the scope of the present invention.

As shown, a method 600 begins at step 601, where serial mask register 422 within receiver 420 receives serial clock signal 429 from serial clock 411. Serial mask register 422 includes serial mask 433, which, in general, is identical to serial mask 413 that is included within serial mask register 402. At step 602, serial shift register 422 shifts serial mask 433. At each shift of serial mask 433, a new bit of that mask becomes the "mask bit" which indicates whether a discardable value is to be received across interconnect 440 at the current serial clock cycle. At step 603, AND gate 423 determines whether the mask bit is currently set. If the mask bit is set, indicating that discardable data is not to be received, then the method 600 proceeds to step 604. At step 604, deserializer 424 shifts a portion of data 412 that has already been received so that the new, non-discardable value can be stored.

At step 603, if the mask bit is not set, then the method 600 proceeds to step 605, where deserializer 424 receives a discardable value. Since deserializer 424 does not receive gated clock signal 430 from AND gate 413 upon receiving discardable data, deserializer 424 does not shift the portion of data 412 already received. Thus, the repeated discardable data is redundantly written into deserializer 424. At step 606, data destination 426 determines whether divided clock signal 431 was received from clock divider 415. Divided clock signal 431 indicates that data 412 has been entirely transmitted across interconnect 440. If divided clock signal 431 was not received, then the method 600 returns to step 601 and deserializer 424 continues to receive additional portions of data 412. Otherwise, the method 600 proceeds to step 607, where data destination 426 receives the deserialized data from deserializer 424. That deserialized data should be identical to data block 408.

Receiver 420 is configured to implement the method 600 in order to scale the size of data 412 down to match the lower bandwidth associated with the element that includes receiver 420. With this approach, that element may operate with a low bandwidth, yet still retain the ability to receive data at a much higher bandwidth across interconnect 440. A second embodiment of the above-disclosed invention is described in greater detail below in conjunction with FIGS. 7-9.

Scaling Bandwidth by Dividing and Recombining Data

Figure 7:
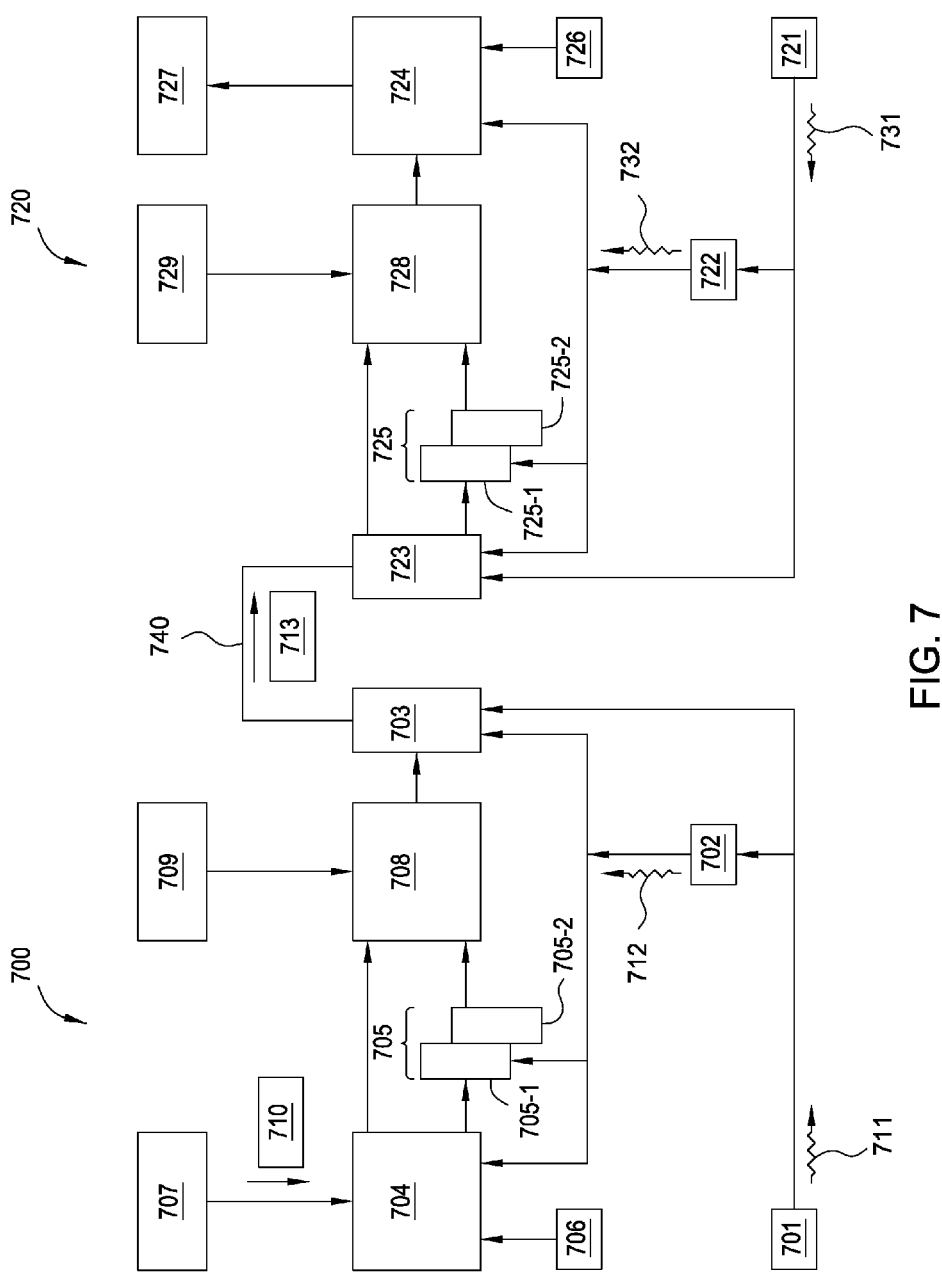
FIG. 7 is a block diagram of a transmitter and a receiver that operate at a low bandwidth coupled together by an interconnect that operates at a high bandwidth, according to another embodiment of the present invention.
Figure 8:
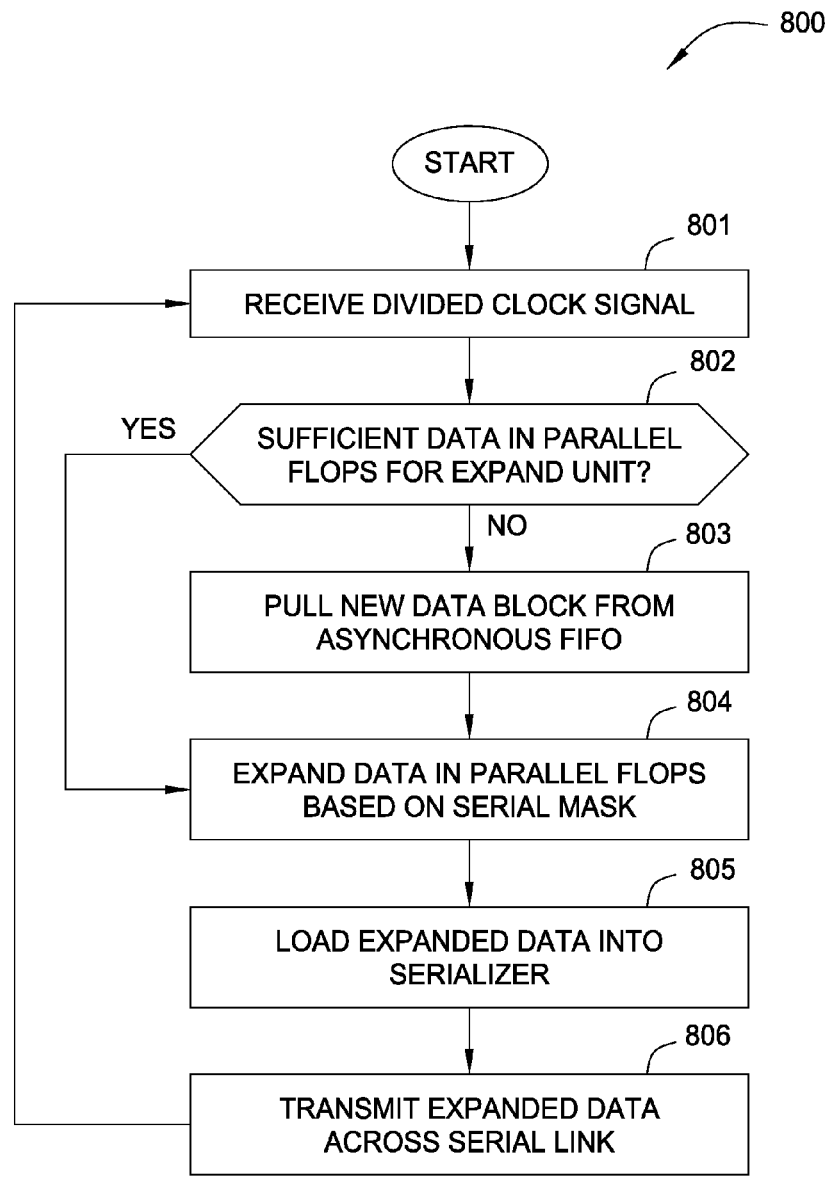
FIG. 8 is a flow diagram of method steps for scaling the bandwidth associated with a transmitter to match the bandwidth associated with an interconnect, according to another embodiment of the present invention.
Figure 9:
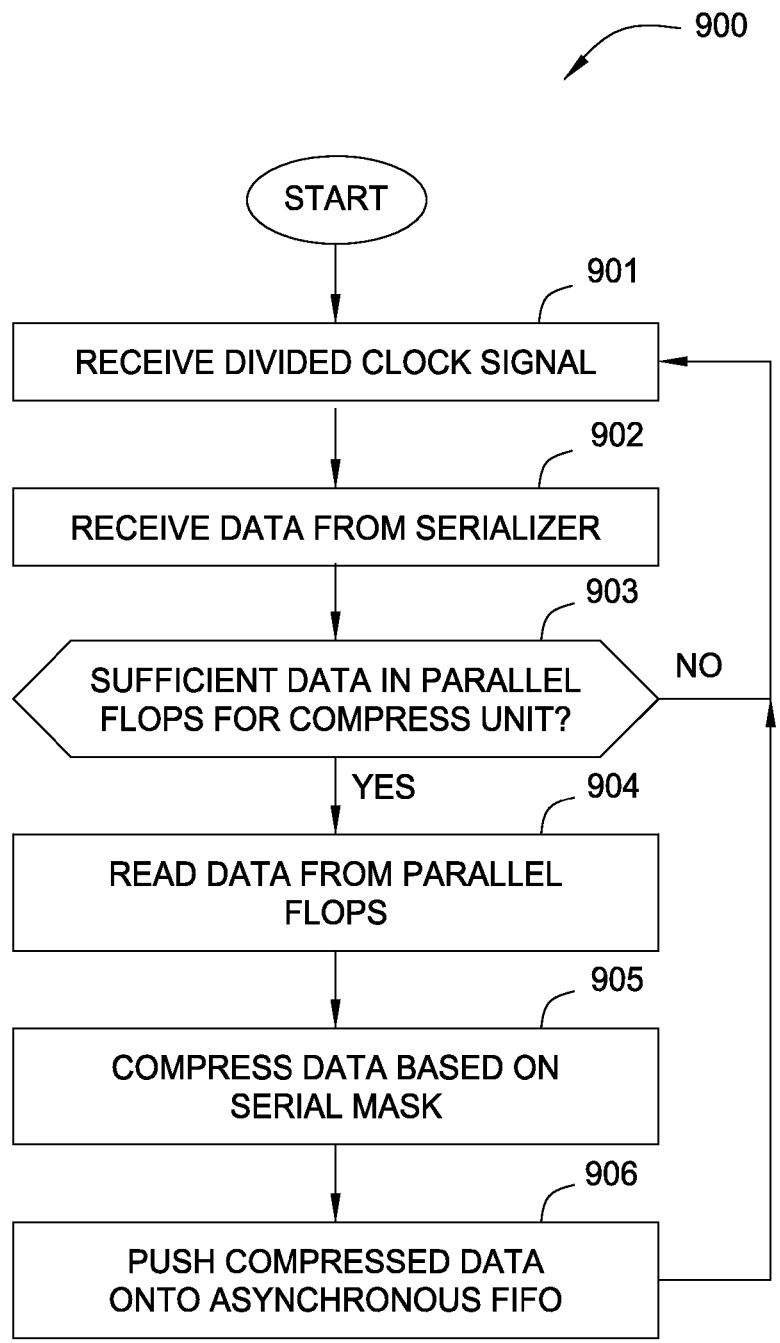
FIG. 9 is a flow diagram of method steps for scaling the bandwidth associated with an interconnect to match the bandwidth of a receiver, according to another embodiment of the present invention.

The transmitter and receiver described above in conjunction with FIGS. 4-6 may be integrated into many of the elements shown in FIGS. 1-3 in order to mitigate a bandwidth mismatch between element and interconnect, as mentioned. However, some of the elements shown in FIGS. 1-3 may not be adaptable to include the transmitter and receiver of FIGS. 4-6. In particular, certain "legacy" systems may not be easily modified to include additional logic that is driven by a serial clock. FIGS. 7-9 describe a second embodiment of the present invention that may be implemented by logic not driven by a serial clock. As such, the second embodiment described below may be more compatible with legacy systems.

FIG. 7 is a block diagram of a transmitter 700 and a receiver 720 that operate at a low bandwidth coupled together by an interconnect 440 that operates at a high bandwidth, according to another embodiment of the present invention. As shown, transmitter 700 includes a serial clock 701, a clock divider 702, a serializer 703, an asynchronous first-in first-out (FIFO) 704, parallel flops 705 that include flops 705-1 and 705-2, a source clock 706, an expand unit 708, and a serial mask 709. Serial clock 701 is coupled to clock divider 702 and serializer 703. Clock divider 702 is coupled to serializer 703, asynchronous FIFO 704, and parallel flops 705. Asynchronous FIFO 704 is coupled to source clock 706 and configured to buffer data block 710 received from data source 707. Parallel flops 705 are coupled between asynchronous FIFO 704 and expand unit 708. Expand unit 708 is configured to access a serial mask 709 and is coupled to serializer 703. In some embodiments, certain elements of transmitter 700 may reside elsewhere within the processing element that includes transmitter 700, including data source 707, serial clock 701, and source clock 706, among others.

Transmitter 700 is configured to scale the size of data block 710 received from data source 707 up to match the bandwidth of interconnect 740. In particular, expand unit 708 is configured to expand data block 710 by parsing a portion of that data block and combing that portion with discardable values based on serial mask 709 to generate data 713. Data 713 is sized to match the bandwidth of interconnect 740. After parsing the portion of data block 710, expand unit 708 stores a remaining portion of data block 710 within parallel flops 705. That remaining portion may be incorporated into other data for transmission at a later time, as describe in greater detail below.

Similar to the serial mask described above in conjunction with FIGS. 4-6, serial mask 709 is a pattern of binary values that indicates whether a discardable or a non-discardable value should be included within data 713 that serializer 703 transmits across interconnect 740. More specifically, the ratio of discardable values to non-discardable values within data 713 is dictated by the ratio of zeros to ones within serial mask 713. For example, if serial mask 713 is a 16-bit value that includes 12 ones and 4 zeros, then data 713 would include 12 non-discardable values and 4 discardable values. In one embodiment, expand unit 708 may implement an encoding function that performs an N to M bit encoding function, where N and M could be, e.g., 12 and 16, respectively, or any other pair of values.

In keeping with the above principle, expand unit 708 is configured to parse different numbers of non-discardable values associated with data block 710 from asynchronous FIFO 704 for inclusion into data 713 depending on the number of bits that are set within serial mask 709. Asynchronous FIFO 704 is also configured to store any remaining non-discardable within flops 705. Returning to the previous example, if serial mask 709 included 16 bits, and 12 of those bits were set to 1, then expand unit could parse 12 bits associated with data block 710 from asynchronous FIFO 704 and then store the remaining 4 bits within flops 705 to be transmitted at a later time. When flops 705 already store remaining values from previous data blocks, expand unit 708 may parse a different number of non-discardable values associated with data block 710 from asynchronous FIFO 704, as needed, to collect 12 non-discardable values. For example, if flops 705 included 4 remaining bits from a previous data block, expand unit need only parse 8 bits associated with data block 710 from asynchronous FIFO 704 for inclusion within data 713, and the remaining 8 bits could then be stored within flops 705. A detailed example of this functionality follows.

Suppose that a first data block provided by data source 707 is 16 bits wide, but serial mask 709 indicates that only 12 of those bits should be sent across interconnect 740. On a first cycle of clock divider 702, expand unit 708 extracts 12 bits from the first data block and stores the remaining 4 bits within flops 705. Expand unit then combines those 12 bits with 4 discardable bits to generate a 16 bit data block that may be transmitted across interconnect 740.

In a second cycle of clock divider 702, flops 705 buffers a second 16 bit data block from FIFO 704, and expand unit 708 than extracts 8 bits from the second data block and combines those 8 bits with the 4 remaining bits from the previous cycle, for a total of 12 bits. Expand unit 708 then combines those 12 bits with 4 discardable bits to generate a 16 bit data block that may be transmitted across interconnect 740. Additionally, flops 705 would then store the remaining 8 bits from the second data block.

In a third cycle of clock divider 702, flops 705 buffers a third 16 bit data block from FIFO 704, and expand unit 708 than extracts 4 bits from the third data block and combines those 4 bits with the 8 remaining bits from the previous cycle, for a total of 12 bits. Expand unit 708 then combines those 12 bits with 4 discardable bits to generate a 16 bit data block that may be transmitted across interconnect 740. Additionally, flops 705 would then store the remaining 12 bits from the third data block.

On a fourth cycle of clock divider 702, flops 705 need not buffer another data block from FIFO 704, because flops 705 stores exactly 12 bits. Expand unit 708 then combines those 12 bits with 4 discardable bits to generate a 16 bit data block that may be transmitted across interconnect 740. The process described above then repeats.

With the approach described thus far, transmitter 700 is capable of scaling the size of data block 710 up to match the bandwidth of interconnect 740, thereby generating data 713. Receiver 720 is configured to receive data 713 at the scaled-up bandwidth. Receiver 720 then scales the size of data 713 back down to match that of the original data (e.g., data 710). Receiver 720 is described in greater detail below.

As shown, receiver 720 includes a serial clock 721, a clock divider 722, a deserializer 723, an asynchronous FIFO 724, parallel flops 725 that include flops 725-1 and 725-2, a source clock 726, a data destination 727, a compress unit 728, a serial mask 729. Serial clock 721 is coupled to clock divider 722 and deserializer 723. Clock divider 722 is coupled to deserializer 723, asynchronous FIFO 724, and parallel flops 725. Asynchronous FIFO 724 is coupled to source clock 726 and configured to buffer data received from expand unit 728. Compress unit 728 is coupled to parallel flops 725, which, in turn, are coupled to deserializer 723. Compress unit 728 is configured to access serial mask 729. In some embodiments, certain elements of receiver 720 may reside elsewhere within the processing element that includes receiver 720, including data destination 727, serial clock 721, and source clock 726, among others.

Receiver 720 is configured to scale the size of data block 713 received from across interconnect 740 down to match the bandwidth associated with a processing element that includes receiver 720. In particular, compress unit 728 is configured to remove the discardable values inserted into data 713 by transmitter 700 based on serial mask 729. Serial mask 729 is generally identical to serial mask 709, and so compress unit 728 is capable of performing the reverse of the process performed by expand unit 708 (discussed above) in order to remove the discardable values. In one embodiment, compress unit 728 may implement a decoding function that performs an M to N bit decoding function, where M and N could be, e.g., 16 and 12, respectively. The decoding function implemented by compress unit 728 would essentially be the inverse of the encoding function implemented by expand unit 708.

In addition, compress unit 728 may parse different non-discardable portions of data 713 and store those different portions within flops 725 in situations where data 713 includes non-discardable values from different data blocks. Compress unit 728 is configured to buffer those different portions within flops 725 and then reconstruct the original data blocks from which those different portions were originally parsed. Compress unit 728 then outputs reconstructed data blocks to asynchronous FIFO 724, which, in turn, provides those data blocks to data destination 727. In one embodiment, flops 725 reside between compress unit 728 and asynchronous FIFO 724. In this embodiment, compress unit 728 may extract non-discardable bits from each incoming block and store them until a full data block has been accumulated. Full data blocks would then be transmitted to asynchronous FIFO 724.

When implementing the approach described above, transmitter 700 and receiver 720 may negotiate a common serial mask by communicating with one another across interconnect 740, or may select the same preset serial mask from a collection of possible serial masks. Generally, transmitter 700 and receiver 720 may implement any technically feasible approach in order to negotiate a common serial mask to use when adjusting bandwidth in the fashion described above.

An advantage of the techniques described herein is that elements that include transmitter 700 and receiver 720 may scale voltage and/or frequency, thereby reducing their respective clock rates, yet retain the ability to communicate with one another over interconnect 740 at a higher bandwidth. In addition, transmitter 700 and receiver 740 may be more compatible with legacy systems compared to the approach described above in conjunction with FIGS. 4-6, because none of the new logic operates according to serial clocks 701 and 721, respectively.

Persons skilled in the art will recognize that a given element within computer system 100 may include instances of both transmitter 700 and receiver 720, thereby allowing that element to scale bandwidth up for transmission purposes and scale bandwidth down for reception purposes. The functionality of transmitter 700 is described, in stepwise fashion, below in conjunction with FIG. 8.

FIG. 8 is a flow diagram of method steps for scaling the bandwidth associated with a transmitter to match the bandwidth associated with an interconnect, according to another embodiment of the present invention. Although the method steps are described in conjunction with the systems of FIGS. 1-3 and 7, persons skilled in the art will understand that any system configured to perform the method steps, in any order, is within the scope of the present invention.

As shown, a method 800 begins at step 801, where flops 705 receive divided clock signal 712 from clock divider 702. On a given divided clock signal, flops 705 may or may not pull a data block from asynchronous FIFO 704. At step 802, expand unit 708 determines whether sufficient data is stored within flops 705 to construct data 713 for transmission across interconnect 740. If there is not sufficient data within flops 705, then at step 803, expand unit 708 causes flops 705 to pull an additional data block from asynchronous FIFO 704. Otherwise, the method 800 proceeds to step 804.

At step 804, expand unit 708 expands data stored within flops 705 into data 713 based on serial mask 709. The data stored within flops 705 could include, for example, data block 710. Expand unit 708 may parse a portion of that data block for incorporation into data 713, and then store a remaining portion in flops 705 for later use. Alternatively, the data stored within flops 705 could also include portions of data block 710 as well as portions of a previous data block. Expand unit 708 may combine these portions for incorporation into data 713. At step 805, expand unit 708 loads data 713 into serializer 703. At step 806, serializer 703 transmits data 713 across interconnect 740 to receiver 720.

Transmitter 700 is configured to implement the method 800 in order to scale the size of data block 710 up to match the bandwidth associated with interconnect 740. With this approach, a processing element that includes transmitter 700 may operate with a low bandwidth, yet still retain the ability to transmit data at a much higher bandwidth across interconnect 740. Receiver 720 may then receive that data at the high bandwidth, and scale that bandwidth back down by implementing a technique that is described in stepwise fashion below in conjunction with FIG. 9.

FIG. 9 is a flow diagram of method steps for scaling the bandwidth associated with a receiver to match the bandwidth of a receiver, according to another embodiment of the present invention. Although the method steps are described in conjunction with the systems of FIGS. 1-3 and 7, persons skilled in the art will understand that any system configured to perform the method steps, in any order, is within the scope of the present invention.

As shown, a method 900 begins at step 901, where parallel flops 725 receive divided clock signal 732 from clock divider 722. At step 902, parallel flops 725 receive data from deserializer 723. That data could be, for example, data 713. Parallel flops 725 are configured to buffer data received from deserializer 722. That data includes discardable values inserted into that data via the techniques described in conjunction with FIG. 7. In addition, that data may include different portions of data associated with different data blocks. At step 903, compress unit 728 determines whether sufficient non-discardable values are resident within parallel flops 725 to reconstruct a data block. If compress unit 728 determines that parallel flops 725 store insufficient data, then the method 900 returns to step 901. Otherwise, if compress unit 728 determines that parallel flops 725 store sufficient data, then the method 900 proceeds to step 904.

At step 904, compress unit 728 reads data from parallel flops 725 that is associated with a particular data block. That data includes both discardable and non-discardable values, as mentioned above. In addition, that data may reside within flops 725 in different portions that were received at different times. Compress unit 728 is configured to analyze the data stored in parallel flops 725 and, based on serial mask 729, parse various portions of data that are associated with the same data block. In doing so, compress unit may store any data not associated with that same block within parallel flops 725 for later use. At step 905, compress unit 728 compresses the data parsed from parallel flops 725 into a data block by removing any discardable values stored therein. At step 906, compress unit 728 pushes the data block onto asynchronous FIFO 906 for delivery to data destination 727. The method 900 then repeats.

Receiver 720 is configured to implement the method 900 in order to scale the size of data 713 down to match the lower bandwidth associated with the element that includes receiver 720. With this approach, that element may operate with a low bandwidth, yet still retain the ability to receive data at a much higher bandwidth across interconnect 740.

In sum, a transmitter is configured to scale up a low bandwidth delivered by a first processing element to match a higher bandwidth associated with an interconnect. A receiver is configured to scale down the high bandwidth delivered by the interconnect to match the lower bandwidth associated with a second processing element. The first processing element and the second processing element may thus communicate with one another across the interconnect via the transmitter and the receiver, respectively, despite the bandwidth mismatch between those processing elements and the interconnect.

Advantageously, in computer systems where the clock rate of an interconnect cannot be easily changed, processing elements with variable clock rates may retain the ability to communicate with one another across the interconnect. In addition, the approach disclosed herein does not require costly buffers, complex credit systems, or idle cycles of the interconnect, as prior art techniques require. Consequently, the disclosed approach may result in more efficient use of the interconnect than possible with prior techniques.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for scaling the bandwidth of a processing element to match the bandwidth of an interconnect that operates at a second bandwidth, the method comprising:
   receiving, at a first bandwidth, a first data block from a first processing element according to a first divided clock signal, wherein the first divided clock signal is derived from a first clock signal based on a size of the first data block, the first processing element operates at the first bandwidth, and the first divided clock signal has a lower frequency than the first clock signal;
   transmitting, at the second bandwidth, a first non-discardable value included in the first data block to a second processing element based on a first serial mask that comprises a series of binary mask bits;
   determining that a first discardable value should be transmitted to the second processing element based on a mask bit included in the first serial mask; and
   transmitting, at the second bandwidth, the first discardable value to the second processing element.

2. The computer-implemented method of claim 1, further comprising:
   receiving a first serial clock signal; and
   in response, shifting the first serial mask to include a modified mask bit.

3. The computer-implemented method of claim 2, further comprising:
   receiving a first gated clock signal generated in response to the modified mask bit included in the first serial mask, wherein the first gated clock signal is associated with a frequency that is lower than a frequency associated with the first serial clock signal;
   repositioning the first data block to present a second non-discardable value included in the first data block to the interconnect; and
   transmitting, at the second bandwidth, the second non-discardable value to the second processing element.

4. The computer-implemented method of claim 3, wherein the first gated clock signal is generated by applying an AND operation to the first serial mask and a first clock signal.

5. The computer-implemented method of claim 1, further comprising:

receiving a first gated clock signal generated in response to a mask bit included in the first serial mask, wherein the first gated clock signal has a lower frequency than the first clock signal;
deriving the first divided clock signal from the first gated clock signal based on the size of the first data block, wherein the first divided clock signal is associated with a frequency that is lower than the frequency associated with the first gated clock signal; and
receiving, at the first bandwidth, a second data block from the first processing element based on the first divided clock signal.

6. The computer-implemented method of claim 5, further comprising:
   receiving, at the second bandwidth, the first non-discardable value from the first processing element and across the interconnect;
   determining that the first non-discardable value should not be discarded based on a mask bit included in a second serial mask that is substantially similar to the first serial mask; and
   storing the first non-discardable value within a first position of a third data block.

7. The computer-implemented method of claim 6, further comprising:
   receiving, at the second bandwidth, the first discardable value from the first processing element and across the interconnect;
   discarding the first discardable value based on the mask bit included in the second serial mask.

8. The computer-implemented method of claim 7, further comprising:
   receiving a second serial clock signal; and
   in response, shifting the second serial mask to include a modified mask bit.

9. The computer-implemented method of claim 8, further comprising:
   receiving a second gated clock signal generated in response to the modified mask bit included in the second serial mask, wherein a frequency associated with the second gated clock signal is lower than a frequency associated with the second serial clock signal;
   shifting the second data block in response to the second gated clock signal;
   receiving, at the second bandwidth, the second non-discardable value from the first processing element across the interconnect; and
   storing the second non-discardable value within a second position of the third data block.

10. The computer-implemented method of claim 1, further comprising:
    receiving a second divided clock signal that is derived from a second gated clock signal based on the size of the first data block, wherein the second divided clock signal is associated with a frequency that is lower than a frequency associated with the second gated clock signal; and
    providing, at the first bandwidth, a second data block to the second processing element based on the second divided clock signal, wherein the second data block is substantially similar to the first data block.

11. The computer-implemented method of claim 1, wherein the first serial mask comprises a sequence of binary values, and each binary value included in the first serial mask indicates whether a portion of the data to be transmitted across the interconnect to the second processing element should include discardable data or non-discardable data.

12. The computer-implemented method of claim 1, wherein the first discardable value is derived from the first non-discardable value.

13. A system, comprising:
an interconnect that operates at a second bandwidth; and
a first processing element coupled to the interconnect and configured to:
receive, at a first bandwidth, a first data block from a first data source associated with the first processing element according to a first divided clock signal, wherein the first divided clock signal is derived from a first clock signal based on a size of the first data block, the first processing element operates at the first bandwidth, and the first divided clock signal has a lower frequency than the first clock signal;
transmit, at the second bandwidth, a first non-discardable value included in the first data block to a second processing element based on a first serial mask that comprises a series of binary mask bits;
determine that a first discardable value should be transmitted to the second processing element based on a mask bit included in the first serial mask; and
transmit, at the second bandwidth, the first discardable value to the second processing element.

14. The system of claim 13, wherein the first processing element is further configured to:
receive a first serial clock signal; and
in response, shift the first serial mask to include a modified mask bit.

15. The system of claim 14, wherein the first processing element is further configured to:
receive a first gated clock signal generated in response to the modified mask bit included in the first serial mask, wherein the first gated clock signal is associated with a frequency that is lower than a frequency associated with the first serial clock signal;
reposition the first data block to present a second non-discardable value included in the first data block to the interconnect; and
transmit, at the second bandwidth, the second non-discardable value to the second processing element.

16. The system of claim 13, wherein the first processing element is further configured to:
receive a first gated clock signal generated in response to a mask bit included in the first serial mask, wherein the first gated clock signal has a lower frequency than the first clock signal;
derive the first divided clock signal from the first gated clock signal based on the size of the first data block, wherein the first divided clock signal is associated with a frequency that is lower than the frequency associated with the first gated clock signal; and
receive, at the first bandwidth, a second data block from the first data source based on the first divided clock signal.

17. The system of claim 16, further including:
a second processing element configured to:
receive, at the second bandwidth, the first non-discardable value from the first processing element and across the interconnect;
determine that the first non-discardable value should not be discarded based on a mask bit included in a second serial mask that is substantially similar to the first serial mask; and
store the first non-discardable value within a first position of a third data block.

18. The system of claim 17, wherein the second processing element is further configured to:
receiving, at the second bandwidth, the first discardable value from the first processing element and across the interconnect;
discarding the first discardable value based on the mask bit included in the second serial mask.

19. The system of claim 18, wherein the second processing element is further configured to:
receive a second serial clock signal; and
in response, shift the second serial mask to include a modified mask bit.

20. The system of claim 19, wherein the second processing element is further configured to:
receive a second gated clock signal generated in response to the modified mask bit included in the second serial mask, wherein a frequency associated with the second gated clock signal is lower than a frequency associated with the second serial clock signal;
shift the second data block in response to the second gated clock signal;
receive, at the second bandwidth, the second non-discardable value from the first processing element across the interconnect; and
store the second non-discardable value within a second position of the third data block.

21. The system of claim 13, wherein the second processing element is further configured to:
receive a second divided clock signal that is derived from a second gated clock signal based on the size of the first data block, wherein the second divided clock signal is associated with a frequency that is lower than a frequency associated with the second gated clock signal; and
provide, at the first bandwidth, the second data block to the second processing element based on the second divided clock signal, wherein the second data block is substantially similar to the first data block.

22. A computing device configured to scale the bandwidth of a processing element to match the bandwidth of an interconnect that operates at a second bandwidth, comprising:
a memory; and
a first processing element coupled to the memory and configured to:
receive, at a first bandwidth, a first data block from a first data source associated with the first processing element according to a first divided clock signal, wherein the first divided clock signal is derived from a first clock signal based on a size of the first data block, the first processing element operates at the first bandwidth, and the first divided clock signal has a lower frequency than the first clock signal;
transmit, at the second bandwidth, a first non-discardable value included in the first data block to a second processing element based on a first serial mask that comprises a series of binary mask bits;
determine that a first discardable value should be transmitted to the second processing element based on a mask bit included in the first serial mask; and
transmit, at the second bandwidth, the first discardable value to the second processing element.

\* \* \* \* \*